(12) United States Patent
Yadav

(10) Patent No.: US 9,330,193 B1
(45) Date of Patent: May 3, 2016

(54) METHOD AND SYSTEM FOR DISPLAYING COMPONENTS IDENTIFIED BY GUID

(75) Inventor: Sunil Kumar Yadav, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/595,309

(22) Filed: Aug. 27, 2012

(51) Int. Cl.
G06F 17/30 (2006.01)

(52) U.S. Cl.
CPC ............................. *G06F 17/30893* (2013.01)

(58) Field of Classification Search
CPC .... G06F 17/2247; G06F 17/211; G06F 17/24
USPC ................................. 707/640, 654, 655, 656
See application file for complete search history.

(56) References Cited

U.S. PATENT DOCUMENTS

| 7,797,355 | B1* | 9/2010 | Lanzatella | G06F 3/0601 |
| | | | | 707/810 |
| 8,306,951 | B2* | 11/2012 | Ghosh | G06F 11/2025 |
| | | | | 707/610 |
| 8,364,640 | B1* | 1/2013 | Beatty | G06F 11/1469 |
| | | | | 707/640 |
| 2003/0197710 | A1* | 10/2003 | Gonsalves | G11B 27/34 |
| | | | | 345/600 |
| 2004/0078691 | A1* | 4/2004 | Cirne | G06F 11/3624 |
| | | | | 714/38.13 |
| 2005/0138040 | A1* | 6/2005 | Lamb | H04L 67/1097 |
| 2008/0005287 | A1* | 1/2008 | Harvey | G06F 8/20 |
| | | | | 709/220 |
| 2008/0177994 | A1* | 7/2008 | Mayer | G06F 9/4418 |
| | | | | 713/2 |
| 2008/0307299 | A1* | 12/2008 | Marchant | G06F 17/30893 |
| | | | | 715/234 |
| 2009/0083257 | A1* | 3/2009 | Bargeron | G06F 17/30734 |
| 2010/0306830 | A1* | 12/2010 | Hardt | G06F 21/33 |
| | | | | 726/4 |
| 2012/0005166 | A1* | 1/2012 | Pace | G06F 8/60 |
| | | | | 707/654 |
| 2012/0150805 | A1* | 6/2012 | Pafumi | G06F 11/1415 |
| | | | | 707/640 |
| 2013/0268916 | A1* | 10/2013 | Misra | G06F 8/74 |
| | | | | 717/123 |

* cited by examiner

*Primary Examiner* — Hosain Alam
*Assistant Examiner* — Ahmed Abraham
(74) *Attorney, Agent, or Firm* — Staniford Tomita LLP

(57) ABSTRACT

This disclosure relates to a method, article of manufacture, and apparatus for backing up data. In some embodiments, this includes obtaining a root component, wherein the root component is associated with a first GUID, a first display name, and a first type, obtaining components associated with the root component, identifying qualifying components from the components, storing the qualifying components in a structure, at each invocation of a procedure processing each of the qualifying components, obtaining subcomponents associated with a qualifying component, identifying qualifying subcomponents from the subcomponents, storing the qualifying subcomponents in the structure, and determining whether the subcomponents have been processed, and if the subcomponents have not been processed, recursively invoking the procedure.

13 Claims, 4 Drawing Sheets

Data Structure 400

| GUID 410 | Display Name 420 | Type 430 | Parent 440 | Other 450 |

METHOD AND SYSTEM FOR DISPLAYING COMPONENTS IDENTIFIED BY GUID

FIELD

The present invention relates generally to data systems and specifically to systems and methods of displaying components associated with globally unique identifiers in data systems.

BACKGROUND

A globally unique identifier (GUID) is a unique reference number that may be used as an identifier in computing. The value of a GUID is presented as a 32-character hexadecimal string, such as {21EC2020-3AEA-1069-A2DD-08002B30309D}, and is usually stored as a 128-bit integer. It may be used to distinguish hardware, software, networking, or a user, among others. For example, Microsoft Windows® uses GUIDs internally to identify the classes and interfaces of objects. Without having to know details such as the name or location of a specific class or object, scripts containing GUIDs may be used to activate the class or object. However, the drawback of using only GUID in a system is that merely displaying a 32-character hexadecimal string, such as the GUID example shown above, is not intuitive to average users. Users may not easily comprehend the hexadecimal string to extract information such as the name or the label of a component associated with a GUID.

There is a need, therefore, for an improved method or system to display GUID more intuitively.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
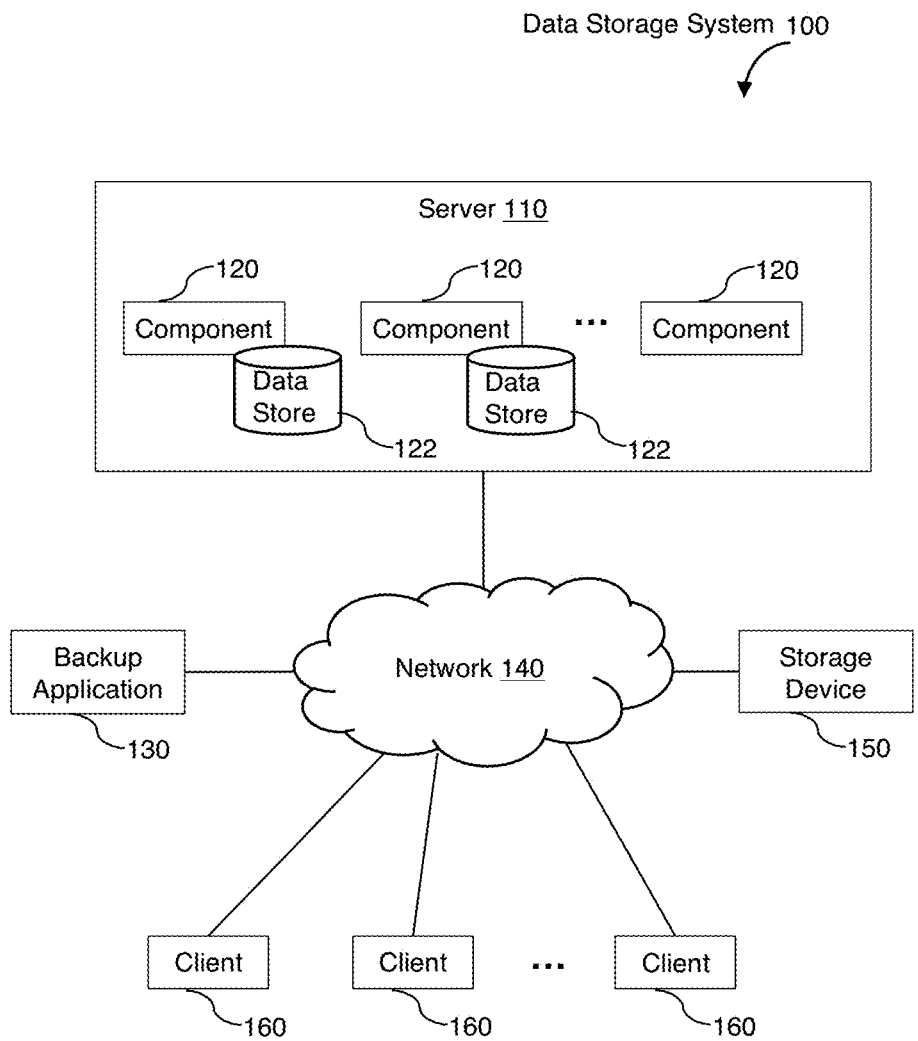
FIG. 1 is a diagram of a data storage system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

FIG. 1 illustrates an exemplary system for implementing the present invention, in accordance with some embodiments.

Data Storage System 100 includes Server 110, Backup Application 130, Clients 160, and Storage Device 150 connected by Network 140. Clients 160 may be laptops, desktops, or virtual machines. In some embodiments, Server 110 may represent a web and/or application server processing requests from Clients 160. Generally, Server 110 may provide data to Clients 160 upon request. Server 110 may also provide services such as performing searches of content and/or providing analytical tools etc.

Though FIG. 1 illustrates only one Server 110, the exemplary environment may include a set of servers. These servers may be presented to Clients 160 as a single server or a "virtual" server when processing requests from Clients 160. In accordance with some embodiments, Server 110 may also execute Backup Application 130 to store backup data on Storage Device 150 and transfer backup data to Data Storage System 100 when necessary. In other embodiments, Backup Application 130 may reside and operate or to be operated outside Server 110. Backup Application 130 may even reside and operate or to be operated outside Data Storage System 100.

Network 140 provides connectivity among Server 100, Clients 160, Backup Application 130, and Storage Device 150. Network 140 may be implemented using protocols such as Transmission Control Protocol (TCP) and/or Internet Protocol (IP), well known in the relevant arts. Network 140 may also be implemented to provide support for various storage architectures such as storage area network (SAN), Network-attached Storage (NAS), Direct-attached Storage (DAS), etc. In some embodiments, Network 140 may be a dedicated communication link, one or more networks, a local area network, a wide area network, a storage area network, the Internet, a wired network, and/or wireless network, among others.

Storage Device 150 may represent a non-volatile storage system to store backup data generated within Data Storage System 100. Though FIG. 1 depicts only one Storage Device 150, Data Storage System 100 may include multiple storage devices. Storage Device 150 in turn may include one or more disks, each containing a different portion of data stored on Backup Storage. The storage space in Storage Device 150 may also be apportioned pursuant to a file system, or may be logical or virtual (i.e. not corresponding to underlying physical storage) or may be subdivided into a plurality of volumes or logical devices. The logical devices may or may not correspond to the physical storage space of the disks. Thus, for example, a physical storage device may contain a plurality of logical devices or, alternatively, a single logical device could span across multiple physical devices. Server 110 and Clients 160 may be configured to access any combination of logical devices independent of the actual correspondence between the logical devices and the physical devices. Storage Device 150 may be provided as a stand-alone device coupled relatively directly to Server 110 and/or Clients 160 or, alternatively, Storage Device 150 may be part of a storage area network (SAN) that includes a plurality of other storage devices as well as routers, network connections, etc. The system described herein may be implemented using software, hardware, and/or a combination of software and hardware where software may be stored in an appropriate storage medium and executed by one or more processors.

In some embodiments, Server 110 may further include one or more Components 120. Each Component 120 may be responsible for performing one or more server tasks. It should be noted that different Components 120 of Server 110 may be deployed and executed on different systems to facilitate the performance of tasks. Components 120 may be logically embodied in hardware or firmware, or a collection of instructions such as software instruction, written in instructions or one or more programming languages. Some Components 120 may be associated with data stores 122. Components 120 may be the logical representation of data stores 122. Data stores 122 may be backed up through running Backup Application 130 and the backup data may be stored on Storage Device 150 for later recovery.

Figure 2:
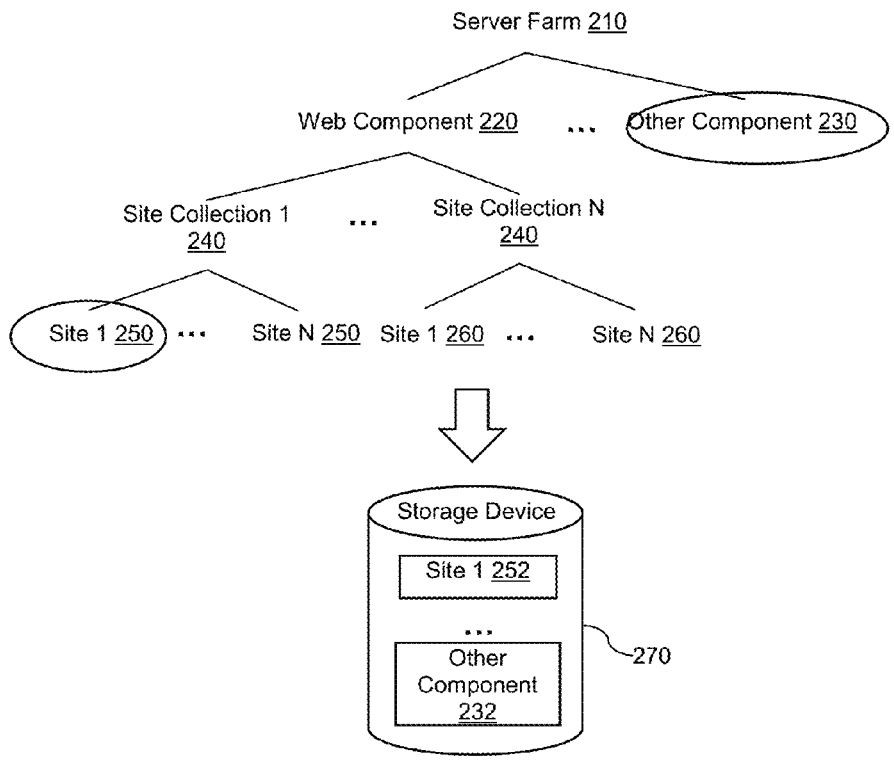
FIG. 2 is a diagram illustrating an exemplary server farm used in FIG. 1.

Although FIG. 1 illustrates only one level of Components 120, each Component 120 may further include multiple levels of subcomponents. For example, in an exemplary embodiment of the present invention, as shown in FIG. 2, Server 110 may be a set of servers denoted as Server Farm 210. Server Farm 210 as a root component may include one or more subcomponents, such as Web Component 220 . . . Other Component 230. Web Component 220 may further include one or more subcomponents such as Site Collection 1 240 . . . Site Collection N 240. Site Collection 1 240 may further include Site 1 250 . . . Site N 250. Similarly, Site Collection N 240 may further include Site 1 260 . . . Site N 260.

During a backup and/or recovery, based on some criteria, one or more components illustrated in FIG. 2 may be identified as qualifying components. Among qualifying components, a user may identify one or more components for backup and/or recovery. The data stores associated with the identified components may be backed up and the backup data may be stored on Storage Device 270 for later recovery. For example, as illustrated in FIG. 2, components Site 1 250 and Other Component 230 may be identified by a user for backup and/or recovery. The data store associated with Site 1 250 may be stored on Storage Device 270 as Site 1 252 for later recovery. Similarly, the data store associated with Other Component 230 may be stored on Storage Device 270 as Other Component 232 for later recovery. In some embodiments, the entire Server Farm 210 may be identified as a qualifying component for backup and/or recovery. During Server Farm 210 backup, the data store associated with Server Farm 210 and the data stores associated with qualifying subcomponents of Server Farm 210 may be stored on Storage Device 270 for later recovery.

Figure 3:
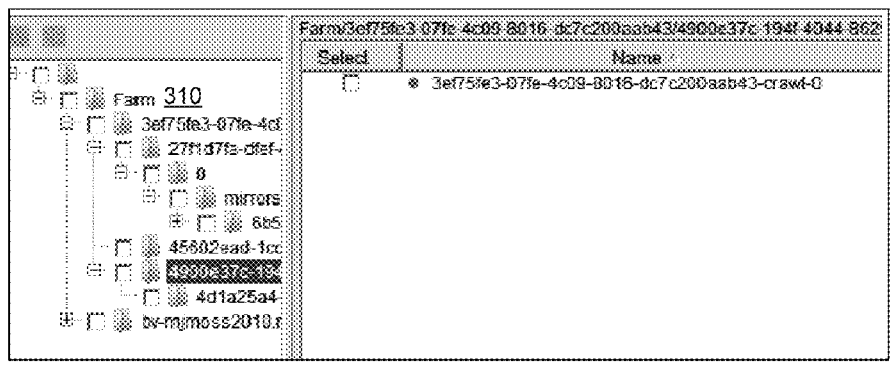
FIG. 3 is a pictorial diagram of an exemplary interface that illustrates the difficulty of displaying components identified by GUID's.

Traditional backup application may display GUID's to represent various components, as illustrated in FIG. 3. FIG. 3 illustrates a portion of a backup system user interface and demonstrates the complexity of locating a component for backup. In FIG. 3, GUID's may be presented as 32-character hexadecimal strings. It is difficult to extract information such as the types and/or the names of the corresponding components within Farm 310. A user may have to extract the information manually or by using some tools before identifying a component and selecting the component for backup and/or recovery. Instead of displaying GUID, displaying the name and type of each component may be more intuitive to users, therefore may improve the efficiency in a backup operation.

Figures 4, 5, 6:
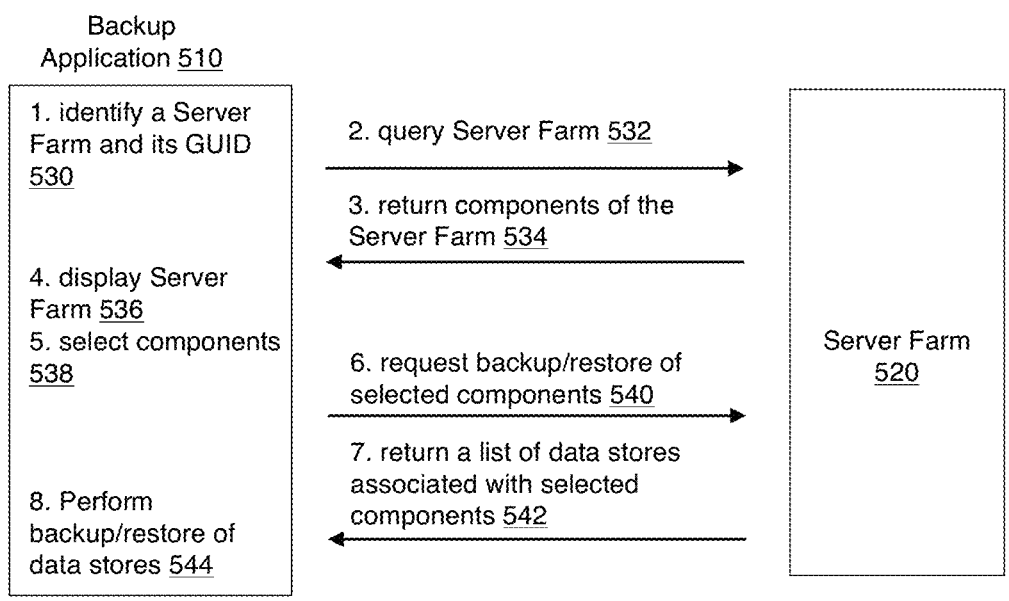
FIG. 4 is a table that illustrates a data structure containing an association of GUID with display name, in accordance with some embodiments.
FIG. 5 is a diagram of the interaction between a backup application and a server farm, in accordance with some embodiments.
FIG. 6 is a pictorial diagram of an exemplary interface that displays components identified by GUID's, in accordance with some embodiments.

FIG. 4 illustrates an exemplary data structure to facilitate the displaying of a component. In some embodiments, Data Structure 400 may include a component's identifier GUID 410, Display Name 420, Type 430, a pointer to Parent 440, and Other fields 450. Information for a component, such as the component's GUID, display name, and type may be stored in Data Structure 400.

To obtain the information stored in Data Structure 400, in some embodiments, the root component GUID may be obtained from an application such as a backup application. If the root component is a qualifying component, for each component associated with the root component, the GUID associated with the component may be obtained from querying a server. When querying the server, the root component GUID may be sent to the server in order to obtain all components associated with the root component. After obtaining the components, some criteria may be applied to identify only qualifying components. For each qualifying component, a GUID may be stored as GUID 410 in Data Structure 400. Similarly, the display name and the type associated with the qualifying component may be obtained from querying the server and stored as Display Name 420 and Type 430 respectively. A pointer pointing to the root component may be stored in Parent 440. In some embodiments, the procedure of obtaining components and subcomponents may be conducted recursively until all qualifying components associated with root component have been processed. Alternative algorithms including non-recursive and non-traditional algorithms may also be used by those of ordinary skill in the art to process components associated with the root component. Once the process ends, following the pointer stored in Parent 440, the path of the recursive traversal may be recorded, starting from the root component to a subcomponent, then to the next level subcomponent, and ending when the subcomponent has no more subcomponents.

For example, Site 1 250 in FIG. 2 may be stored in the exemplary Data Structure 400. Site 1 250 GUID as the identifier may be stored in GUID 410 field. The value of Display Name 420 for Site 1 250 may be stored as Site 1. The value of Type 430 for Site 1 250 may be stored as Site. A pointer pointing Site Collection 1 240 may be stored in Parent 440 field. Following the pointer, the path of the traversal starting from Server Farm 210, to Web Component 220, then to Site Collection 1 240, and ending at Site 1 250 may be recorded. Having displayable information stored in Data Structure 400 for each qualifying component, components associated with a root component may be mapped. And using the displayable information stored in Data Structure 400 may display components more intuitively to users.

FIG. 5 is a flowchart illustrating the interaction of a backup application and a server farm, in accordance with some embodiments. In step 530, Server Farm 520 GUID may be obtained from Backup Application 510. In some embodiments, Server Farm 520 may be identified as a root component and Server Farm 520 GUID may be obtained from Backup Application 510. In other embodiments, a component associated with Server Farm 520 may be identified as a root component, and the component's GUID may be obtained from Backup Application 510. Upon obtaining the root component GUID, Backup Application 510 may then use root component GUID to query Server Farm 520 in step 532 for components associated with the root component. In response, in step 534, Server Farm 520 may return information related to the components associated with the root components. The components information obtained from Server Farm 520 may be parsed and stored in a structure as illustrated in FIG. 4. Also in step 534, in some embodiments, criteria may be applied to obtain only certain qualifying components associated with Sever Farm 520 for backup and/or recovery. For example, criteria may be applied to obtain only components within Server Farm 520 that are associated with certain types of data stores so that such data stores may be backed up and/or recovered.

Having received components information from Server Farm 520, in step 536, Backup Application 510 may use the information stored in the structure as illustrated in FIG. 4 and display components more intuitively to users. Viewing information such as the display name and the type of a component, in step 538, users may select one or more items from the stored structure for backup and/or recovery. Backup Application 510 may then send a backup and/or recovery request to Server Farm 520 in step 540. In some embodiments, the request sent by Backup Application 510 may include a list of items including GUID's corresponding to various components selected by users. In response to the request, in step 542, Server Farm 520 may return a list of components corresponding to the list of items selected. The list of components may include the information related to the data stores associated with the list of components. In step 544, using the information related to the data stores received from Server Farm 520, Backup Application 510 may locate the data stores and perform backup and/or recovery of the data stores.

In some embodiments, step 540 through step 544 may be performed through an intermediary. For example, in case Server Farm 520 is a SharePoint Farm, a product from Microsoft Corporation, Server Farm 520 may be backed up and/or restored by leveraging SharePoint VSS Writers, also a product from Microsoft Corporation. Using SharePoint VSS Writers as an intermediary is the Microsoft recommended approach and is widely used by many backup products. In step 540, Backup Application 510 may request through SharePoint VSS Writers a list of items to be backed up and/or restored. The list of items may include GUID's corresponding to various components within Server Farm 520. In response, in step 542, Server Farm 520 may return information for locating the data stores associated with the components through an intermediary such as SharePoint VSS Writer. Using the information, in step 544, Backup Application 510 may locate the data stores and back up and/or restore the data stores associated with selected components through an intermediary such as SharePoint VSS Writer.

FIG. 6 illustrates a portion of a backup system user interface using the present invention, in accordance with some embodiments. With the present invention, instead of displaying GUID associated with a component, the display name and the type of the component may be displayed. A user may obtain information associated with the component more intuitively, and make decisions of whether to back up and/or restore the component more efficiently.

Figure 7A:
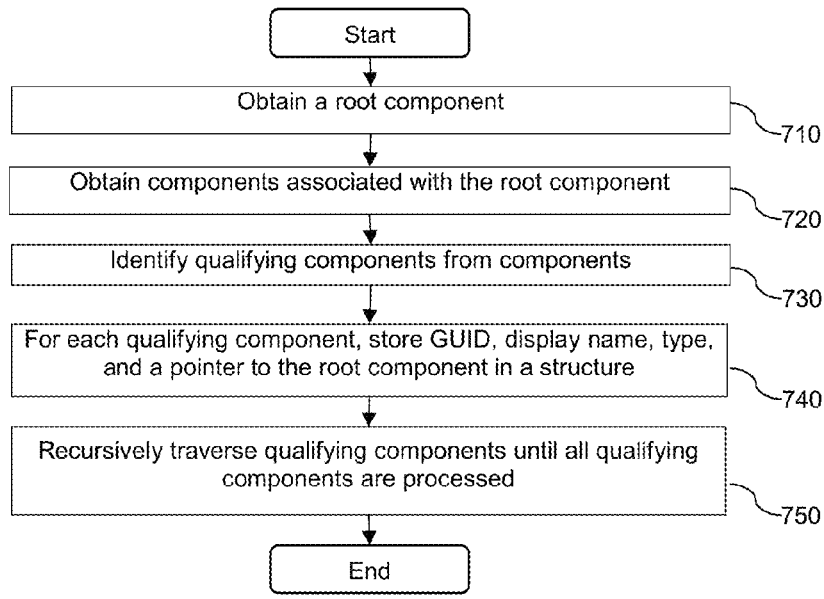
FIG. 7A is a flowchart of a method for traversing components associated with a root component, in accordance with some embodiments.

FIG. 7A illustrates one embodiment of a flowchart of a method for traversing components associated with a root component. In step 710, information associated with a root component may be obtained. In some embodiments, the information such as GUID associated with the root component may be obtained from a backup application. In step 720, one or more components associated with the root components may be obtained. The components information may be obtained by querying a server, such as Server 110 or Server Farm 210. In step 730, the components associated with the root components may be examined and only qualifying components based on certain criteria may be identified. In some embodiments, the criteria may be based on the type of the component. In step 740, a structure as illustrated in FIG. 4 may be used to store each qualifying component's GUID, display name, and type. In addition, in step 740, a pointer to the component's parent, namely the root component, may also be stored in the structure. In step 750, all qualifying components may be recursively queried to locate one or more subcomponents associated with each qualifying component. The recursive process may end when all qualifying components have been processed. In some embodiments, instead of the recursive process in step 750, alternative algorithms including non-recursive and non-traditional algorithms may also be used by those of ordinary skill in the art.

Figure 7B:
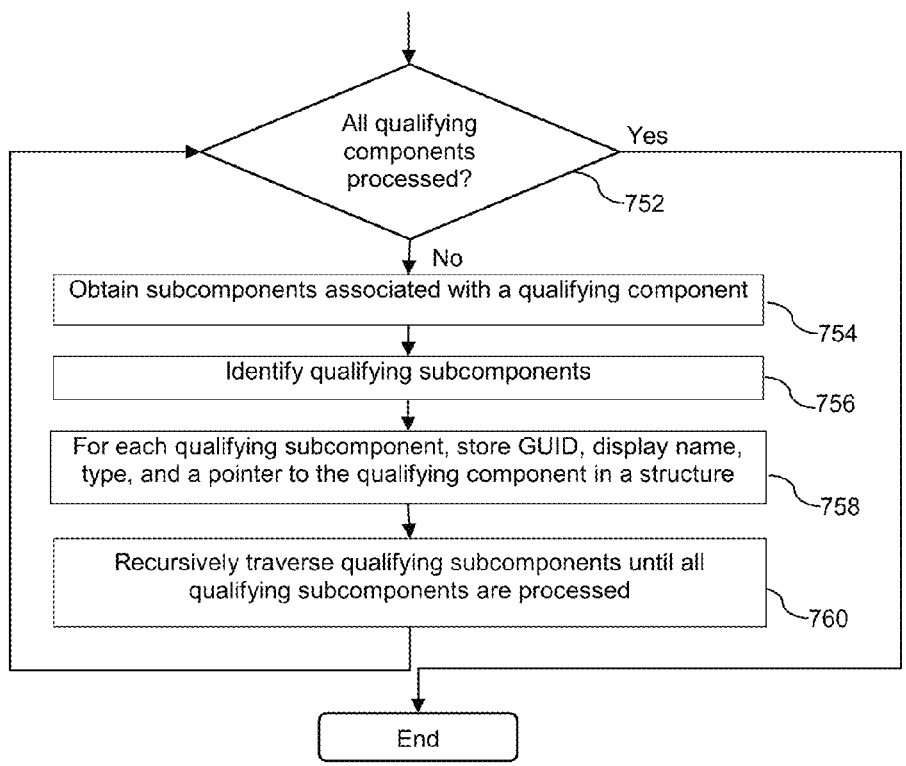
FIG. 7B is a flowchart of a method for recursively traversing components, in accordance with some embodiments.

FIG. 7B further illustrates the recursive process of step 740, in accordance with some embodiments. The recursive process may end when a determination in step 752 finds that all qualifying components associated with the root component have been processed. In step 754, one or more subcomponents associated with a qualifying component may be obtained. The subcomponents information may be obtained by querying a server, such as Server 110 or Server Farm 210. Such information may include each subcomponent's GUID, display name, and type. Among the subcomponents, criteria may be applied to identify qualifying subcomponents. In some embodiments, the criteria may be based on the type of a subcomponent. In step 758, a structure as illustrated in FIG. 4 may be used to store each qualifying subcomponent's GUID, display name, and type. In addition, in step 758, a pointer to the subcomponent's parent, namely the qualifying component, may also be stored in the structure. In step 760, the recursive process may continue to the next level to recursively traverse all qualifying subcomponents until all qualifying subcomponents have been processed.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method comprising:
   obtaining a root component with a root component globally unique identifier (GUID);
   issuing a query comprising the root component GUID to a server farm;
   obtaining, in response to the query, components associated with the root component, wherein at least a subset of the components are associated with a plurality of data stores, the plurality of data stores comprising at least data stores of a first type, and data stores of a second type, different from the first type;
   identifying qualifying components from the components, wherein the qualifying components are associated with data stores to be backed up and restored, and the identifying qualifying components comprises:
   determining whether a component of the subset is associated with a data store of the first type or the second type,
   if the component is associated with a data store of the first type, identifying the component as a qualifying component, and
   if the component is associated with a data store of the second type, not identifying the component as a qualifying component;
   storing the qualifying components in a structure, the structure comprising a first field, and second field, wherein the first field stores a GUID associated with the qualifying component, and the second field stores a display name associated with the qualifying component;
   at each invocation of a procedure processing each of the qualifying components,
      obtaining subcomponents associated with a qualifying component,
      identifying qualifying subcomponents from the subcomponents, wherein the qualifying subcomponents are associated with one or more data stores to be backed up and restored,
      storing the qualifying subcomponents in the structure, and
      determining whether the subcomponents have been processed;
   invoking the procedure recursively when the subcomponents have not been processed;
   after the processing each of the qualifying components, accessing the structure to display on a computer display a listing of the qualifying components, wherein the listing displayed on the computer display comprises display names associated with the qualifying components, and omits GUIDs associated with the qualifying components;
   receiving from a user a selection of one or more qualifying components that are displayed in the listing;
   backing up data stores associated with the user selected qualifying components, the backed up data stores being data stores of the first type;
   displaying items in the structure, wherein each of the items displayed is associated with a GUID, the items displayed include a display name, a type, and a pointer pointing to a parent and the items displayed do not include the GUID;
   identifying a list of items from the structure based on at least the display name associated with each of the items;
   requesting a list of components corresponding to the list of items for a restore through an intermediary; and
   performing the restore of the list of components through the intermediary.

2. The method as recited in claim 1, wherein obtaining the root component includes obtaining the root component from a backup application.

3. The method as recited in claim 1, further comprises:
   displaying items in the structure, wherein each of the items displayed is associated with a GUID, the items displayed include a display name, and a type, and the items displayed do not include the GUID; and
   identifying a list of items from the structure based on at least the display name associated with each of the items.

4. The method as recited in claim 1, wherein obtaining the components associated with the root component includes querying at least one server using the root component GUID associated with the root component, and obtaining the components associated with the root component from the at least one server.

5. The method as recited in claim 1, wherein each of the components is associated with a second GUID, a second display name, a second type, and a first pointer to the root.

6. The method as recited in claim 5, wherein identifying the qualifying components from the components includes for each of the components, identifying a qualifying component based on the second type.

7. The method as recited in claim 5, wherein storing the qualifying components in the structure includes for each of the qualifying components, storing the second GUID, the second display name, the second type, and the first pointer to the root in the structure.

8. The method as recited in claim 5, wherein obtaining the subcomponents associated with the qualifying component includes querying at least one server using the second GUID associated with the qualifying component, and obtaining the subcomponents associated with the qualifying component from the at least one server.

9. The method as recited in claim 1, wherein each of the subcomponents is associated with a third GUID, a third display name, a third type, and a second pointer to the qualifying component.

10. The method as recited in claim 9, wherein identifying the qualifying subcomponents from the subcomponents includes for each of the qualifying subcomponents, identifying a qualifying subcomponent based on the third type.

11. The method as recited in claim 9, wherein storing the qualifying subcomponents in the structure includes for each of the qualifying subcomponents, storing the third GUID, the third display name, the third type, and the second pointer to the qualifying component in the structure.

12. A storage system comprising: a processor configured to
obtain a root component with a root component globally unique identifier (GUID),
issue a query comprising the root component GUID to a server farm,
obtain, in response to the query, components associated with the root component, wherein at least a subset of the components are associated with a plurality of data stores, the plurality of data stores comprising at least data stores of a first type, and data stores of a second type, different from the first type,
identify qualifying components from the components, wherein the qualifying components are associated with data stores to be backed up and restored, and the identification comprises:
  determining whether a component of the subset is associated with a data store of the first type or the second type,
  if the component is associated with a data store of the first type, identifying the component as a qualifying component, and
  if the component is associated with a data store of the second type, not identifying the component as a qualifying component,
store the qualifying components in a structure, the structure comprising a first field, and a second field, wherein the first field stores a GUID associated with the qualifying component, and the second field stores a display name associated with the qualifying component,
at each invocation of a procedure processing each of the qualifying components,
  obtain subcomponents associated with a qualifying component,
  identify qualifying subcomponents from the subcomponents, wherein the qualifying subcomponents are associated with one or more data stores to be backed up and restored,
  store the qualifying subcomponents in the structure, and
  determine whether the subcomponents have been processed,
recursively invoke the procedure when the subcomponents have not been processed,
after the qualifying components have been processed, access the structure to display on a computer display a listing of the qualifying components, wherein the listing displayed on the computer display comprises display names associated with the qualifying components, and omits GUIDs associated with the qualifying components,
receive from a user a selection of one or more qualifying components that are displayed in the listing,
backup data stores associated with the user selected qualifying components, the backed up data stores being data stores of the first type,
display items in the structure, wherein each of the items displayed is associated with a GUID, the items displayed include a display name, a type, and a pointer pointing to a parent and the items displayed do not include the GUID,
identify a list of items from the structure based on at least the display name associated with each of the items,
request a list of components corresponding to the list of items for a restore through an intermediary; and
perform the restore of the list of components through the intermediary.

13. A computer program product comprising a non-transitory computer usable medium having machine readable code embodied therein for:
obtaining a root component with a root component globally unique identifier (GUID);
issuing a query comprising the root component GUID to a server farm;
obtaining, in response to the query, components associated with the root component, wherein at least a subset of the components are associated with a plurality of data stores, the plurality of data stores comprising at least data stores of a first type, and data stores of a second type, different from the first type;
identifying qualifying components from the components, wherein the qualifying components are associated with data stores to be backed up and restored, and the identifying qualifying components comprises:
  determining whether a component of the subset is associated with a data store of the first type or the second type,
  if the component is associated with a data store of the first type, identifying the component as a qualifying component, and
  if the component is associated with a data store of the second type, not identifying the component as a qualifying component;
storing the qualifying components in a structure, the structure comprising a first field, and a second field, wherein the first field stores a GUID associated with the qualifying component, and the second field stores a display name associated with the qualifying component;
at each invocation of a procedure processing each of the qualifying components,
  obtaining subcomponents associated with a qualifying component,
  identifying qualifying subcomponents from the subcomponents, wherein the qualifying subcomponents are associated with one or more data stores to be backed up and restored, storing the qualifying subcomponents in the structure, and determining whether the subcomponents have been processed;

recursively invoking the procedure when the subcomponents have not been processed;

after the processing each of the qualifying components, accessing the structure to display on a computer display a listing of the qualifying components, wherein the listing displayed on the computer display comprises display names associated with the qualifying components, and omits GUIDs associated with the qualifying components;

receiving from a user a selection of one or more qualifying components that are displayed in the listing;

backing up data stores associated with the user selected qualifying components, the backed up data stores being data stores of the first type;

displaying items in the structure, wherein each of the items displayed is associated with a GUID, the items displayed include a display name, a type, and a pointer pointing to a parent and the items displayed do not include the GUID;

identifying a list of items from the structure based on at least the display name associated with each of the items;

requesting a list of components corresponding to the list of items for a restore through an intermediary; and performing the restore of the list of components through the intermediary.

* * * * *